United States Patent [19]
Jungmann

[11] 3,937,650
[45] Feb. 10, 1976

[54] NUCLEAR REACTOR PROTECTIVE SYSTEM

[75] Inventor: Axel Jungmann, Erlangen, Germany

[73] Assignee: Siemens Aktiengesellschaft, Munich, Germany

[22] Filed: July 26, 1973

[21] Appl. No.: 382,841

[30] Foreign Application Priority Data
Aug. 2, 1972  Germany............................ 2238024

[52] U.S. Cl..................................... 176/37; 176/85
[51] Int. Cl............................................ G21c 13/10
[58] Field of Search ............. 176/37, 38, 85, DIG. 2

[56] References Cited
UNITED STATES PATENTS

| | | | |
|---|---|---|---|
| 3,047,486 | 7/1962 | Hanson.......................... | 176/DIG. 2 |
| 3,159,550 | 12/1964 | Laming.......................... | 176/DIG. 2 |
| 3,216,902 | 11/1965 | Costs ............................ | 176/DIG. 2 |

*Primary Examiner*—Robert F. Stahl
*Attorney, Agent, or Firm*—Kenyon & Kenyon Reilly Carr & Chapin

[57] ABSTRACT

A nuclear reactor protective system includes a cylindrical concrete wall surrounding the reactor's pressure vessel in radially spaced relation with respect to the latter, the space between the two being large enough to permit the insertion of a device for monitoring the pressure vessel's wall condition. To protect the concrete wall against thermal radiation from the reactor pressure vessel's wall, a plurality of metal plates are positioned in this space, each in the form of a cylindrical segment, the pressure vessel's wall being cylindrical. These plates partially overlap each other normally to form a circumferentially continuous multi-layer arrangement of the metal plates which are slightly radially interspaced by thermally non-conductive members to provide dead air-space thermal insulation between the pressure vessel's wall and the concrete wall. These overlapping plates are positioned in the space between the two walls so that at least some of the plates adjacent to the pressure vessel's wall may be circumferentially displaced to more completely overlap and open the space to provide room for the insertion of the device adjacent to the pressure vessel's wall to monitor the condition of the latter, these plates being replaced to their original positions after the monitoring. Other features are included.

9 Claims, 3 Drawing Figures

NUCLEAR REACTOR PROTECTIVE SYSTEM

BACKGROUND OF THE INVENTION

A nuclear reactor normally includes a pressure vessel containing the reactor core and confining a coolant, such as a pressurized water coolant. The pressure vessel's wall has a generally cylindrical shape and, as part of a protective system, the pressure vessel is enclosed by a concrete wall which functions as both protection in the event of a rupture of the presssure vessel and to provide a biological shield. This protective concrete wall is desirably radially spaced from the pressure vessel's wall to provide room for insertion between the two of a suitable device for monitoring the condition of the pressure vessel's wall from time to time. This space desirably should not be obstructed so as to prevent such monitoring which may require the insertion of an ultrasonic, pressure vessel wall, monitoring device between the two walls.

At the same time, it is desirable to protect the biological shield's concrete wall surrounding the pressure vessel's wall, from thermal shock, and also mechanical shock in the unfortunate event of the rupture of the reactor pressure vessel's wall.

Thus it can be seen that there is the dual problem of accessibility to the reactor pressure vessel's wall within the space between it and the cylindrical wall of the concrete biological shield, while at the same time there is the need for having this space occupied by an element or elements protecting the concrete biological shield's wall both from thermal radiation and possibly mechanical shock in the event the pressure vessel's wall ruptures.

SUMMARY OF THE INVENTION

With the above in mind, one of the objects of the present invention is to provide such protection between the reactor pressure vessel's wall and the concrete biological shield's wall, while at the same time providing for accessibility to the pressure vessel's wall permitting its monitoring by the insertion of a suitable device between the two walls.

According to the invention, this object is attained by positioning a plurality of metal plates in the space between the two walls, each plate being formed as a segment of a cylinder and the various plates being arranged in circumferentially overlapping relationship, the plates being positioned axially with respect to the pressure vessel's wall for the full extent that the construction of the reactor permits, and at least some of the plates adjacent to the pressure vessel's wall being positioned so that they may be displaced, by being more fully overlapped, circumferentially relative to the pressure vessel's wall, to provide a space for the insertion of a pressure vessel's wall monitoring device.

Usually the biological shield is a concrete structure, made of prestressed and possibly reinforced concrete which forms a pit providing the cylindrical wall within which the pressure vessel is positioned. The inside diameter of this concrete wall is larger than the outside diameter of the pressure vessel's wall thus forming the radial space between the two walls. The plurality or multiplicity of metal plates between these two walls, are radially interspaced at least slightly to form dead air pockets providing good thermal insulation, the interspacing between the plates being provided by bearing members made of material that is relatively thermally non-conductive. In this way a good thermal radiation barrier is formed between the two walls without providing high thermally conductive paths. These overlapping plates need not occupy the entire radial extent of the space between the two walls, and a continuous metal shell may surround the overlapping plates so that a large tubular channel is formed between this continuous wall and the surrounding concrete wall of the biological shield and through which cooling air may be passed.

Some of the metal plate cylindrical segments, or all of them, may be positioned or suspended between the two walls so that they may be moved circumferentially to further overlap or become further or completely superimposed on each other and thus provide the room or space required for the insertion of the device for monitoring the pressure vessel's wall.

In addition, at least those of the overlapping plates most adjacent to the pressure vessel's wall may be made of a ductilely deformable metal capable of deforming beyond the elastic limit of the metal used, in the event the pressure vessel's wall ruptures. In this way the concrete wall of the biological shield is protected against violent impact by portions of the rupturing pressure vessel's wall, the metal of the plates closer to this wall deforming plastically under the impact of such pieces and providing for a shock-absorbing system.

BRIEF DESCRIPTION OF THE DRAWINGS

The accompanying drawings show preferred embodiments of the present invention and in which.

DESCRIPTION OF THE PREFERRED EMBODIMENTS

Figure 1:
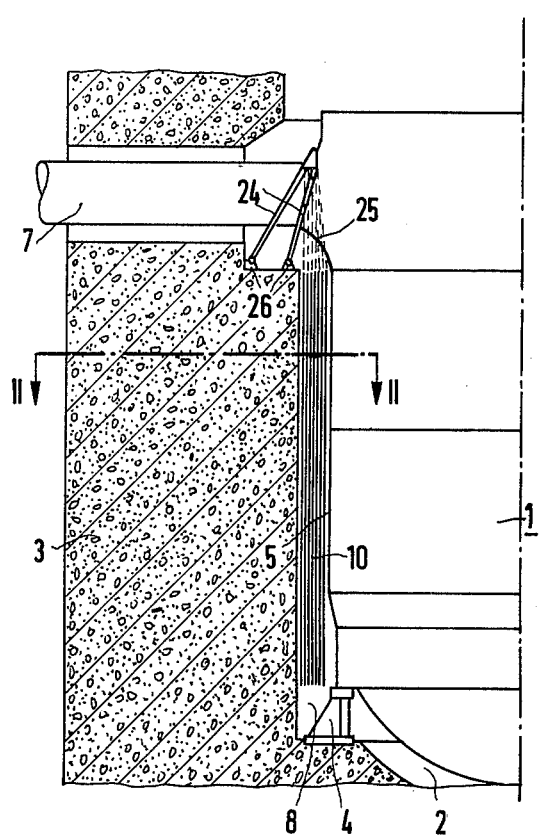
FIG. 1 is a vertical section showing the portion of the concrete biological shield wall surrounding the generally cylindrical wall of the reactor pressure vessel, the latter being shown in elevation, and this view showing only the left-hand side of the installation with respect to the latter's vertical center line.

Referring to the above drawings, FIG. 1 shows in elevation the pressure vessel of a nuclear reactor of the type using pressurized water as a coolant. The previously mentioned cylindrical concrete wall is formed by a reactor pit 2 which is formed by a concrete biological shield 3 which also functions as an interceptor of flying parts of the pressure vessel in the event the latter ruptures. The pressure vessel is supported in the pit 2 by a support ring 4 positioned to support the lower end of the pressure vessel's substantially cylindrical wall 5. The upper end of the pressure vessel 1 has radially extending coolant pipes of which one is shown at 7. Vertically between these pipes and the pressure vessel's support ring 4, a substantially cylindrical space 8 is formed radially between the two walls, and extending circumferentially with respect to these walls, one being the pressure vessel's wall and the other being the wall formed by the biological shield. It is within this space, the bottom end of which is indicated at 8, which extends circumferentially around between the two walls which are radially interspaced from each other, that the overlapping plates of the present invention are arranged as a system, generally indicated at 10 in FIG. 1.

Figure 2:
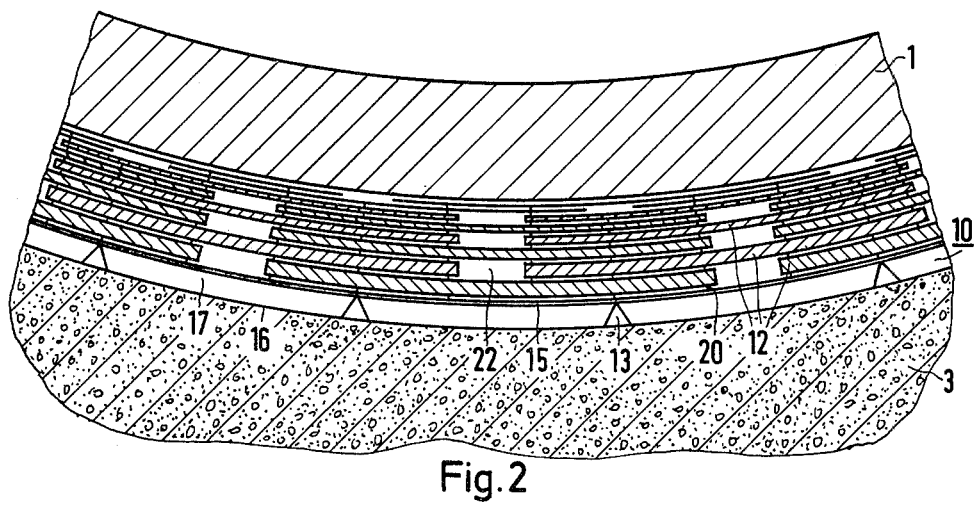
FIG. 2, on an enlarged scale, shows a cross section taken on the line II—II in FIG. 1.

This arrangement 10 is shown in detail by FIG. 2. It consists of the partially overlapping metal plates 12 which, as shown by FIG. 1, extend as much as possible for the full height of the cylindrical wall 5 of the pressure vessel 1, or at least for the extent of this height where protection is most required. These plates 12 are made of metal, such as steel, and each comprises a segment of a cylinder so that in their partial overlapping relationship they provide complete radial protection between the wall of the pressure vessel and the wall of the biological shield. In circumferential extent each of the plates may extend for about 1/16 of the circumference of the pressure vessel. The biological shield is provided with radially inwardly extending support ribs 13 for a sheet metal shell 15 which continuously extends circumferentially around between the pressure vessel and biological shield walls, being spaced inwardly from the latter's concrete surface shown at 16, this surface 16 defining the cylindrical wall of the biological shield. These ribs 13 can be made of structural shapes extending vertically for the vertical length of the wall 16, an interspace 17 being defined by the concrete wall 16 and the steel shell 15 and through which a flow of air or other coolant may be passed to cool the shell 15. Furthermore, these ribs 13 are circumferentially interspaced at locations registering them with the partially overlapped portions of the cylindrical segments of metal plates 12.

The overlapping sections of the plates 12 are separated from each other radially with respect to the two cylindrical walls, by separating or bearing members 20 made of thermally relatively non-conductive material, such as a ceramic material fastened to the various plates by metal mountings (not shown). This forms spaces 22 between the overlapping plate portions and in which spaces static or stagnant areas of air exist to provide good thermal barriers between the plates. The overlapping portions of the plates are separated by this ceramic material of the bearing members 20.

Some of the plates 12, and at least those of the plates adjacent to at least one or more surface areas of the pressure vessel's wall, are mounted so as to be circumferentially movable, this being possible because of their overlapping relationship. Referring to FIG. 1, these movable plates may be suspended from hinged frames 24 by means of steel cables 25, these frames being supported at 26 in the concrete of the biological shield in such a manner that they can be swung in the circumferential direction of the pressure vessel's wall. Therefore, the plates thus suspended can be circumferentially pushed movably to more greatly or completely overlap adjacent plates and form a free space between the wall of the biological shield in the pressure vessel and extending vertically downwardly with respect to the latter and in which a suitable device for monitoring the wall of the latter may be inserted.

Figure 3:
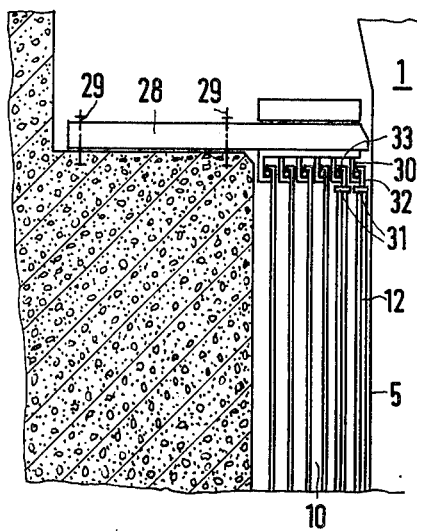
FIG. 3, also on an enlarged scale, shows the upper left-hand portion of FIG. 1, but illustrating a second embodiment of the invention.

Referring now to FIG. 3, in this embodiment of the invention cantilever beams 28 are fastened to the concrete biological shield 3 by screws 29 and provide cantilever ends overhanging the space in which the arrangement 10 is suspended. The overhanging portions of the cantilever beams which, in effect, bridge the space between the walls 5 and 6, removably mount tracks 30, which follow the cylindrical contours of the two walls, and from which, in this instance, the plates 12 are hung, with an innermost group interconnected by a strap 31 for simultaneous movement, by means of hooks 32 provided with rollers 33 running on the tracks 30. In this way the plates of at least the interconnected group may be run from their partially overlapping relation to their more fully or completely overlapping relation to provide the space required for monitoring purposes, the tracks 30 being removed to provide clearance for this space.

In the illustrated embodiment of the invention seven overlapping plates are arranged between the inside of the metal shell 15 and the pressure vessel's wall 5, these plates being uniformly distributed over the circumference of the pressure vessel. The plates closest to the pressure vessel's wall are relatively thin, the plates extending radially outwardly being progressively thicker. The radially outermost plates 12 may be four times as thick as the innermost plates, with the ratio of the air layers formed by the spaces 22 ranging from 0.5 to 2:1.

With the plates preferably being made of steel having adequate ductility to resist rupture when deformed beyond its elastic limits, the thinner plates closest to the reactor vessel deform more readily than the outermost plates which are thicker, in the event of an accident when these plates receive the stress of the impact of portions of the reactor vessel's wall. The ductility of the metal should be such that under such deformation there is no great risk of the plates themselves rupturing. Thus, when the arrangement 10 receives the impact of portions of the pressure vessel's wall, these portions are absorbed in a shock-absorbing manner as the metal of the plates gradually deforms. This shock energy is thus absorbed gradually because the innermost plates are thinnest and the outermost plates are thickest, the variation of sheet gauge of the various plates being graduated outwardly. The ratio of the thickness between the plates extending radially outwardly, may vary from 1:10, wherein the innermost plates are only 1/10 the thickness of the outermost plates. Although the relatively thin shell 15 may also be deformed outwardly and into contact with the concrete wall of the biological shield, all shock is largely absorbed when this occurs by the gradually deforming metal plates, so that the concrete of the biological shield is protected against severe mechanical shock. It is, of course, also protected against thermal shock due to the various intervening layers of stagnant air between the overlapping, circumferentially movable plates and, also, by the moving air which may be forced between the shell 15 and the concrete wall 16.

What is claimed is:

1. A nuclear reactor protective system including a reactor pressure vessel having a substantially cylindrical side wall protected by a biological shield forming a substantially cylindrical concrete wall surrounding said side wall and defining a circumferentially extending space therearound having a radial extent adequate to permit the insertion therein of a device for monitoring the condition of said side wall; wherein the improvement comprises a plurality of substantially cylindrical segments, and means for positioning said segments in said space so that the segments are circumferentially movable between mutually partial circumferential overlapping relationship forming a circumferentially continuous cylindrical wall and more complete circumferential overlapping relationship opening a portion of said space adequate for said insertion.

2. The system of claim 1 in which said segments are formed by metal plates.

3. The system of claim 2 in which a substantially cylindrical metal shell is interposed in radially interspaced relationship between said segments and said concrete wall.

4. The system of claim 3 in which said segments when partially overlapped form a circumferentially complete shield around said side wall, and said concrete wall has strut members extending radially inwardly therefrom to said shell and which radially register with the partially overlapping portions of said segments.

5. The system of claim 4 in which said partially overlapping portions are radially interspaced by interspaced bearing members made of thermally relatively non-conductive material.

6. The system of claim 2 in which said metal plates are made of ductile metal and with a thickness causing them to deform under the force of said side wall when rupturing, to resist this force in a shock-absorbing manner.

7. The system of claim 5 in which said metal plates are made of ductile metal and with a thickness causing them to deform under the force of said side wall when rupturing, to resist this force in a shock-absorbing manner, said plates from plate-to-plate in a radial direction, being increasingly thicker.

8. The system of claim 2 in which said means includes removable tracks supporting members movable thereover and suspending said plates.

9. The system of claim 2 in which said means includes frames which swing in the circumferential direction of the pressure vessel's said side wall and suspending cables connected to said plates and to said frames.

* * * * *